(12) United States Patent
Axnix et al.

(10) Patent No.: US 10,282,311 B2
(45) Date of Patent: *May 7, 2019

(54) CONFIGURING FUNCTIONAL CAPABILITIES OF A COMPUTER SYSTEM

(71) Applicant: International Business Machines Corporation, Armonk, NY (US)

(72) Inventors: Christine Axnix, Dettenhausen (DE); Franz Hardt, Ehningen (DE); Marco Kraemer, Sindelfingen (DE); Jakob C. Lang, Weil im Schoenbuch (DE)

(73) Assignee: International Business Machines Corporation, Armonk, NY (US)

( * ) Notice: Subject to any disclaimer, the term of this patent is extended or adjusted under 35 U.S.C. 154(b) by 93 days.

This patent is subject to a terminal disclaimer.

(21) Appl. No.: 15/265,052

(22) Filed: Sep. 14, 2016

(65) Prior Publication Data

US 2018/0018286 A1 Jan. 18, 2018

Related U.S. Application Data

(63) Continuation of application No. 15/211,347, filed on Jul. 15, 2016.

(51) Int. Cl.
*G06F 9/24* (2006.01)
*G06F 12/14* (2006.01)
(Continued)

(52) U.S. Cl.
CPC .......... *G06F 12/1408* (2013.01); *G06F 21/00* (2013.01); *G06F 21/10* (2013.01);
(Continued)

(58) Field of Classification Search
CPC ......... G06F 12/1408; G06F 2212/1052; H04L 9/3242; H04L 63/0807; G04L 63/061
(Continued)

(56) References Cited

U.S. PATENT DOCUMENTS 4,855,907 A * 8/1989 Ferro, Jr. .......... G06F 17/30952
7,266,815 B2 9/2007 Butt et al.
(Continued)

OTHER PUBLICATIONS

Fair et al., "Reliability, availability, and serviceability (RAS) of the IBM eServerz990," IBM J. Res. & Dev., vol. 48, No. 3/4, pp. 519-534, May/Jul. 2004, © 2014 International Business Machines Corporation.
(Continued)

*Primary Examiner* — Jaweed A Abbaszadeh
*Assistant Examiner* — Volvick Derose
(74) *Attorney, Agent, or Firm* — Jared L. Montanaro

(57) ABSTRACT

Provided is a method for configuring the functional capabilities of a computer system. The computer system may include a persistent memory and a replaceable functional unit. The method may include transferring, in response to a repair action for the functional unit, enablement data that is stored on the functional unit to the persistent memory. The enablement data may specify one or more functional capabilities of the functional unit that are enabled. The method may further include erasing the enablement data from the functional unit after it has been transferred to the persistent storage. The method may further include obtaining a second unique identification item from a replacement unit. The method may further include obtaining new enablement data. The new enablement data may be transferred to the replacement unit.

17 Claims, 11 Drawing Sheets

(51) Int. Cl.
　　　*H04L 9/32* (2006.01)
　　　*H04L 29/06* (2006.01)
　　　*G06F 21/00* (2013.01)
　　　*H04L 9/08* (2006.01)
　　　*G06F 21/10* (2013.01)
　　　*G06F 21/60* (2013.01)
　　　*G06F 9/4401* (2018.01)

(52) U.S. Cl.
　　　CPC .......... *G06F 21/602* (2013.01); *H04L 9/0891* (2013.01); *H04L 9/0894* (2013.01); *H04L 9/3236* (2013.01); *H04L 9/3242* (2013.01); *H04L 63/061* (2013.01); *H04L 63/0807* (2013.01); *H04L 63/123* (2013.01); *G06F 9/4401* (2013.01); *G06F 9/4411* (2013.01); *G06F 2212/1052* (2013.01)

(58) Field of Classification Search
　　　USPC .......................................................... 713/1
　　　See application file for complete search history.

(56) References Cited

U.S. PATENT DOCUMENTS

| | | | |
|---|---|---|---|
| 7,392,420 | B2 | 6/2008 | Butt et al. |
| 8,966,646 | B2* | 2/2015 | Wilson ................. G06F 21/125 711/164 |
| 9,083,510 | B1* | 7/2015 | Lakshman ............ H04L 9/0863 |
| 9,535,676 | B1* | 1/2017 | Forehand ............... G06F 8/61 |
| 2004/0107356 | A1* | 6/2004 | Shamoon ........... H04L 63/0428 713/193 |
| 2004/0261624 | A1* | 12/2004 | Lassota ................. A47J 31/52 99/280 |
| 2005/0086505 | A1* | 4/2005 | Ishibashi ......... G11B 20/00007 713/193 |
| 2007/0005873 | A1* | 1/2007 | Baltes .................... G06F 8/654 711/103 |
| 2007/0011487 | A1* | 1/2007 | Probst ................. G06F 11/2289 714/5.11 |
| 2007/0162753 | A1* | 7/2007 | Nakano ................ H04L 9/0844 713/171 |
| 2009/0007240 | A1* | 1/2009 | Vantalon ................ G06F 21/10 726/4 |
| 2009/0254751 | A1* | 10/2009 | Fujiwara ................... H04L 9/12 713/171 |
| 2009/0303030 | A1* | 12/2009 | Axnix ..................... G06F 21/73 340/501 |
| 2009/0307283 | A1* | 12/2009 | Lehr ................... G06F 11/1461 |
| 2009/0327727 | A1* | 12/2009 | Meijer .................... G06F 21/31 713/170 |
| 2010/0157095 | A1* | 6/2010 | Karn ..................... G11B 27/034 348/231.1 |
| 2011/0191863 | A1* | 8/2011 | O'Connor ........... H04L 63/0876 726/29 |
| 2011/0307573 | A1* | 12/2011 | Lingafelt ............... G06Q 10/10 709/217 |
| 2013/0290259 | A1* | 10/2013 | Hoprich ............ G06F 17/30289 707/634 |
| 2013/0339501 | A1* | 12/2013 | Haze ........................ G06F 8/60 709/223 |
| 2014/0114783 | A1* | 4/2014 | O'Connor .............. G06Q 10/08 705/26.1 |
| 2014/0243970 | A1* | 8/2014 | Yanai .................. A61M 1/1086 623/3.28 |
| 2014/0379593 | A1 | 12/2014 | Koehler et al. |
| 2014/0379595 | A1 | 12/2014 | Slattery et al. |
| 2014/0380490 | A1* | 12/2014 | Sista .................... G06F 21/105 726/26 |
| 2016/0188253 | A1* | 6/2016 | Resch .................. G06F 3/0647 711/172 |
| 2016/0203302 | A1* | 7/2016 | Huscroft ............... G06F 21/105 726/29 |
| 2017/0140324 | A1* | 5/2017 | Dufosse ......... G06Q 10/063114 |
| 2017/0164046 | A1* | 6/2017 | Shamoon ......... H04N 21/43853 |

OTHER PUBLICATIONS

Probst et al., "Flexible configuration and concurrent upgrade for the IBM eServer z900," IBM J. Res. & Dev., vol. 46, No. 4/5, pp. 551-558, Jul./Sep. 2002, © 2002 IBM.

Thorve et al., "Step-by-step guide to IBM Power Systems firmware update," developerWorks, Mar. 26, 2013, 28 pgs., © IBM Corporation 2013.

Axnix et al., "Configuring Functional Capabilities of a Computer System," U.S. Appl. No. 15/211,347, filed Jul. 15, 2016.

List of IBM Patents or Patent Applications Treated as Related, Sep. 13, 2016, 2 pgs.

\* cited by examiner

CONFIGURING FUNCTIONAL CAPABILITIES OF A COMPUTER SYSTEM

BACKGROUND

The present invention relates in general to data processing systems, and in particular, to a method, system and computer program product for configuring functional capabilities of a computer system comprising a persistent memory and a replaceable functional unit.

Asset protection for replaceable functional units of a computer system (e.g., I/O cards) is usually done using cryptographically protected license records. The license record defines the features (e.g., card personality, number of ports, etc.) paid for by the customer. Cryptographic techniques ensure that the license record cannot be modified. The license record is bound to the card serial number to prevent duplication/re-use on multiple cards. During startup of the computer system, the first license record is validated. Then the serial number of the I/O card is compared to the serial number in the license record to determine whether they match. Finally the I/O card is configured according to the license record (e.g., the number of ports allowed, the I/O card personality, etc.).

A repair of a defective I/O card requires a new license record from the computer system manufacturer due to the replacement I/O card having a different serial number. For client accounts which do not have a connection to computer system manufacturer, thus, the new license record must be transported on media, which might cause an additional repair delay and, consequently, may cause problems with the time window reserved for the repair.

SUMMARY

Embodiments of the present disclosure include a method, computer program product, and system for configuring the functional capabilities of a computer system. The computer system may include a persistent memory and a replaceable functional unit. The method may include transferring, in response to a repair action for the functional unit, enablement data that is stored on the functional unit to the persistent memory. The enablement data may specify one or more functional capabilities of the functional unit that are enabled. The method may further include erasing the enablement data from the functional unit after it has been transferred to the persistent storage. The method may further include obtaining a second unique identification item from a replacement unit. The method may further include obtaining new enablement data. The new enablement data may be transferred to the replacement unit.

The above summary is not intended to describe each illustrated embodiment or every implementation of the present disclosure. The aforementioned advantages represent example advantages, and therefore, not all advantages of the various embodiments are described herein. Furthermore, some embodiments of the present disclosure can exhibit none, some, or all of the advantages listed herein while remaining within the spirit and scope of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

DETAILED DESCRIPTION

Figure 1:
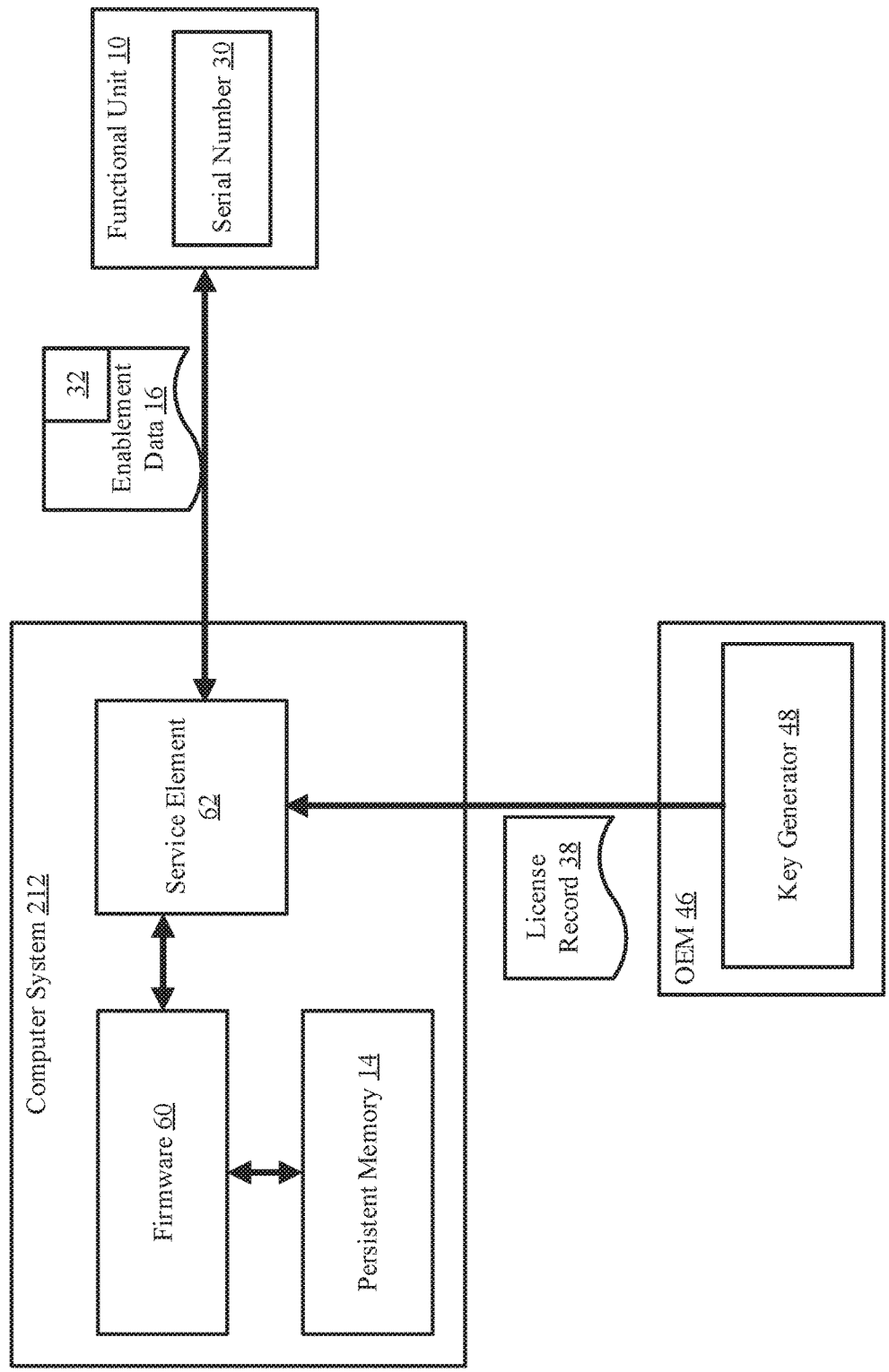
FIG. 1 depicts a block diagram of a computer system during installation of a replaceable functional unit, in accordance with embodiments of the present disclosure.

In the drawings, elements with the same reference numerals may be the same as, or substantially similar to, each other. The drawings are merely schematic representations and are not intended to portray specific parameters of the disclosure. Moreover, the drawings are intended to depict only example embodiments of the disclosure and therefore should not be considered as limiting the scope of the disclosure.

The illustrative embodiments described herein provide a method, system, and computer program product for configuring functional capabilities of a computer system and/or an individual unit within a computer system. The illustrative embodiments are sometimes described herein using particular technologies only as an example for the clarity of the description. The illustrative embodiments may be used for configuring functional capabilities of a computer system comprising a persistent memory and a replaceable functional unit (also referred to herein as a "unit"), wherein enablement data is stored in the unit together with a unique identification item unique for the unit (e.g., the serial number). The enablement data may specify all or a subset of the functional capabilities of the unit. In some embodiments, the enablement data may specify only the functional capabilities of the unit that are enabled. For example, an I/O card may be licensed such that only a subset of its ports are enabled (e.g., a customer may only pay for access to 4 ports, while the card itself may have 8 ports). The enabled ports may be identified by the enablement data.

In some embodiments, during a repair action, the enablement data content can be reassigned to a replacement functional unit with a different serial number based on the enablement data of the old unit. History data may be stored in the enablement data. The old enablement data may be erased from the unit being removed. The modified, and thus new, enablement data may have the same license key content as the old enablement data.

The enablement data may contain a clear text part copied from the license record, history data, and a cryptographically secured value, such as a cryptographic symmetric hash. The cryptographically secured value may be used to verify that the enablement data content has not been tampered with. The clear text may contain fields specifying assets paid for by the customer (e.g., which ports the customer has paid to enable). The history data may contain a list of history elements which is updated every time the enablement data is modified (e.g., by being associated with a new serial number). The history data may contain a timestamp and the serial number of the old unit (e.g., a unit that was replaced). In some embodiments, the first history data entry may contain the timestamp of the original license record. If the space for the history data is used up, a new license record, which may be delivered by the computer system manufacturer, may be needed to enable further changes.

Various embodiments of the present disclosure include a method for configuring functional capabilities of a computer system that includes a persistent memory and a replaceable functional unit, wherein enablement data is stored in the unit together with a unique identification item unique for the unit. The enablement data may specify all or a subset of the functional capabilities of the unit. Specified functional capabilities for functional use may be enabled in the unit, and the remaining (e.g., unspecified) functional capabilities of the unit may be disabled. The enablement data may include a cryptographically secured value, such as a hash, an encrypted value, or the like, derived from secret data and the unique identification item of the unit. The secret data may be stored in the persistent memory. The validity of the enablement data may be determined based on the correctness of its cryptographically secured value. The method may include, in response to a repair action for the unit, (i) transferring the enablement data to the persistent memory and erasing the enablement data on the unit. Further, the method may include, in response to a replacement action for the unit, (ii) obtaining a unique identification item from the replacement unit; (iii) providing new enablement data by either replacing the stored cryptographically secured value in the stored enablement data with a new cryptographically secured value derived from the secret data and the unique identification item of the replacement unit, or by generating the new enablement data; and (iv) transferring the new enablement data to the replacement unit. Generating new enablement data may mean generating enablement data comprising a cryptographically secured value, such as a hash, an encrypted value or the like, derived from new secret data and the unique identification item of the unit.

In some embodiments, the method introduces enablement data for configuring functional capabilities of a computer system. The enablement data represents a licensing record type as a personalization record for a replaceable functional unit, such as an I/O card of a computer system, which is compatible with a commonly used license record. The enablement data may be created by trusted firmware in the computer system itself, and be based on a verified/decrypted license record from the computer system manufacturer. The enablement data record may include a cryptographically secured value such as a cryptographic hash, which is derived from the secret data, such as an original encrypted license key on a license record, delivered by the computer system manufacturer. The cryptographically secured value may be created and verified by the trusted firmware. This method allows changes to the enablement data as a personalization record of the functional unit within the computer system for repair actions, e.g., without requiring a connection to the computer system manufacturer. Other uses, such as, e.g., merging of licensing records, is possible if the need arises.

Thus, in some embodiments, the method includes a module in a trusted environment of a computer system that may verify secret data from the computer system manufacturer as license keys for configuring functional capabilities of a computer system (e.g., for a replaceable functional unit, such as an I/O card). Further, the module may create enablement data as internal license keys, based on the received license keys. Further, the module may verify the enablement data and transform the enablement data in order to forward the license to a replacement unit. Further, the module may merge different enablement data as internal license keys to a combined enablement data.

Enabling the specified functional capabilities for functional use of the unit and disabling the remaining functional capabilities of the unit may be performed by the computer system, by firmware or software in the computer system, or by the replaceable unit itself.

Embodiments of the present disclosure include computer program product for configuring functional capabilities of a computer system. The computer system may include a persistent memory and a replaceable functional unit, wherein enablement data may be stored in the unit together with a unique identification item unique for the unit. The enablement data may specify all or a subset of the functional capabilities of the unit. Specified functional capabilities (e.g., those in the enablement data) for functional use may be enabled in the unit, and remaining functional capabilities of the unit (e.g., those that are not in the enablement data) may be disabled. The enablement data may include a cryptographically secured value (e.g., a hash, an encrypted value, or the like). The cryptographically secured value may be derived from secret data and the unique identification item of the unit. The secret data may be stored in the persistent memory, and the validity of the enablement data may be determined based on the correctness of its cryptographically secured value.

The computer program product may include a computer readable storage medium having program instructions embodied therewith, the program instructions executable by a computer to cause the computer to perform a method. The method may include, in response to a repair action for the unit, (i) transferring the enablement data to the persistent memory and erasing the enablement data on the unit. The method may further include, in response to a replacement action for the unit, (ii) obtaining a unique identification item from the replacement unit; (iii) providing new enablement data either by replacing the stored cryptographically secured value in the stored enablement data with a new cryptographically secured value derived from the secret data and the unique identification item of the replacement unit, or by generating the new enablement data; and (iv) transferring the new enablement data to the replacement unit.

Further embodiments of the present disclosure include a data processing system for execution of a data processing program. The data processing system may include a processor, memory device, and a functional unit. The data processing system may further include computer readable program instructions for performing the various method described herein, such as the method described above.

Turning now to the figures, FIG. 1 depicts a block diagram of a computer system 212 during installation of a replaceable functional unit 10, according to embodiments of the present disclosure. The computer system 212 includes a persistent memory 14, which may be accessed by a firmware 60 of the computer system 212, and the replaceable functional unit 10. Enablement data 16 is stored in the unit 10 together with a unique identification item 30 unique for the unit 10. In some embodiments, the unique identification item 30 may be, for example, the serial number of the unit 10.

The enablement data 16 may specify all or a subset of the functional capabilities of the unit 10. Specified functional capabilities for functional use may be enabled in the unit 10. The remaining functional capabilities of the unit 10 (e.g., the functional capability of the unit 10 that are not specified in the enablement data 16) may be disabled by the computer system 212, by the firmware 60, or by the unit 10 itself. The enablement data 16 may also include a cryptographically secured value 32, which may be implemented as a cryptographic hash value, and which is derived from secret data 20 (shown in FIG. 3). The secret data 20 may be derived from, for example, a license key from the computer system manufacturer 46 and the unique identification item 30 of the unit 10. The secret data 20, as well as the unique identification item 30 of the unit 10, may be transferred to the computer system 212 as part of a license record 38 transmitted by the computer system manufacturer 46.

The cryptographically secured value 32 may include a cryptographic function for ensuring correctness of the enablement data 16. The secret data 20 may be stored in the persistent memory 14 of the computer system 212. The validity of the enablement data 16 may be determined based on the correctness of its cryptographically secured value 32. For example, the firmware 60 may be configured to validate the cryptographically secured value 32 in order to determine the validity of the enablement data (e.g., in order to determine whether the enablement data was tampered with to enable additional functionality that was not paid for).

As discussed herein, various embodiments of the present disclosure include a method for installation of the functional unit 10. The method may include receiving the secret data 20 (e.g., a license key). The secret data 20 may be generated in a key generation facility 48 (e.g., hardware or software module) of the computer system manufacturer 46. The secret data 20 may be stored in the persistent memory 14 of a key verification and generation facility (e.g., module) of the computer system 212. In some embodiments, the key verification and generation facility may be implemented as a firmware 60 of the computer system 212. Enablement data 16 may be generated in this firmware 60, and may be based on the secret data 20 and the unique identification item 30 of the functional unit 10, which may be obtained from the unit 10 and checked against the unique identification item value derived from the secret data 20.

The created enablement data 16 may then be transmitted to the unit 10, thus configuring the functional capabilities of the unit 10, such as, e.g., a number of enabled ports of an I/O card, or the personality of the I/O card. A service element 62 of the computer system 212 may be used for communication between the firmware 60 and the unit 10, but this service element 62 is not mandatory. In some embodiments, the firmware 60 (or any other component of the computer system 212) may communicate with the unit 10 directly, instead of going through the service element 62).

In some embodiments, modifying functional capabilities of the unit 10 may be achieved by modifying enablement data 16 based on new secret data 20 transferred to the persistent memory 14 and transferring the new enablement data 18 to the unit 10.

Figure 2:
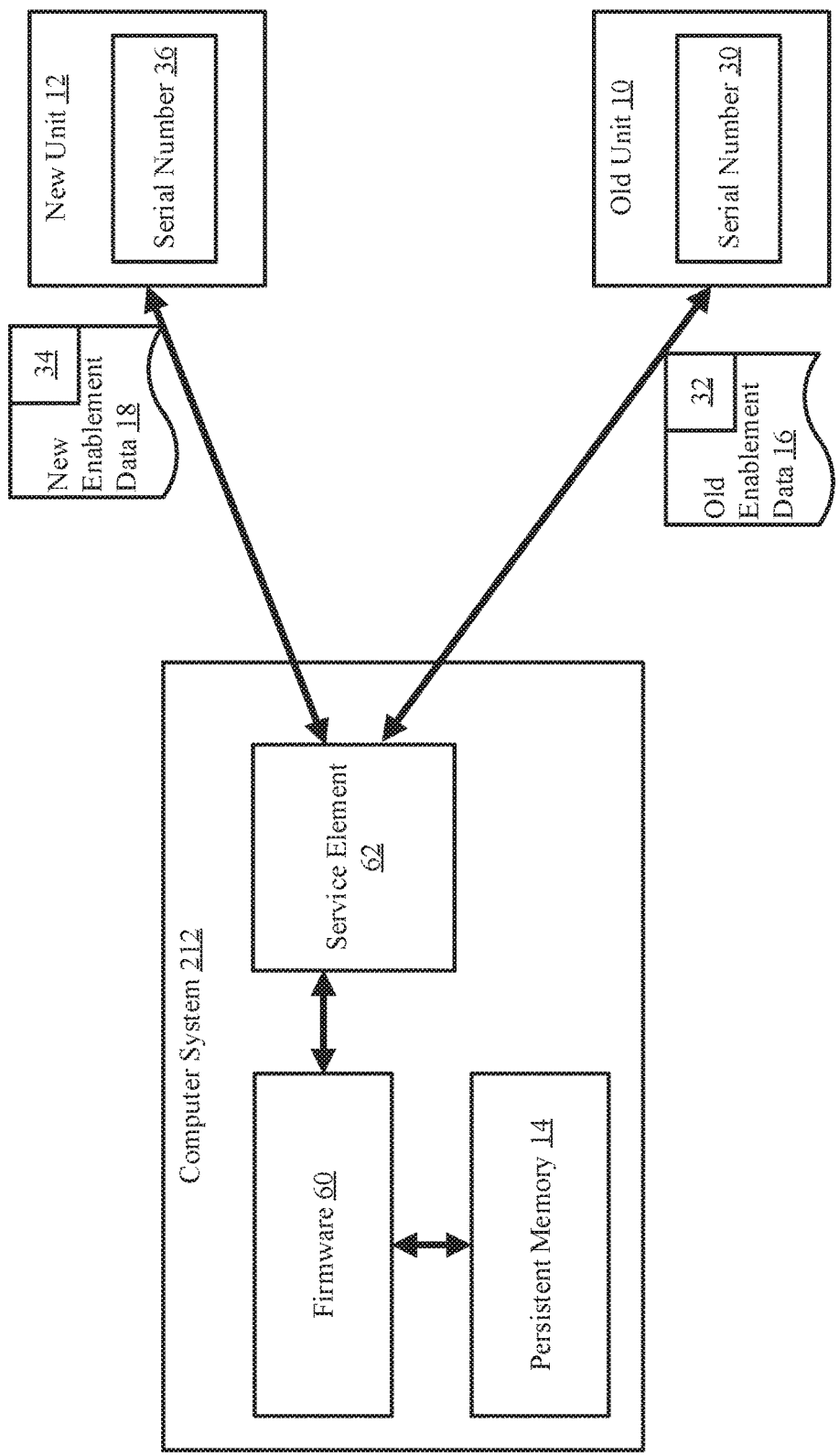
FIG. 2 depicts a block diagram of a computer system during replacement of a functional unit, in accordance with embodiments of the present disclosure.

FIG. 2 depicts a block diagram of a computer system 212 during replacement of a functional unit 10, according to an embodiment of the invention. In response to a repair action for the unit 10, the enablement data 16 of the unit 10 may be transferred from the unit 10 back to the persistent memory 14 and then erased on the unit 10. In response to a replacement action for the unit 10, a unique identification item 36, like the serial number, may be obtained from the replacement unit 12. Then, the new enablement data 18 may be provided either by replacing the stored cryptographically secured value 32 with a new cryptographically secured value 34 derived from the secret data 20 and the unique identification item 36 of the replacement unit 12, or by generating the new enablement data 18, and a new history entry may be added. Finally, the modified, and thus new, enablement data 18 may be transferred to the replacement unit 12, thus configuring the unit 12 in its functional capabilities for operation (e.g., by enabling some ports).

Figure 3:
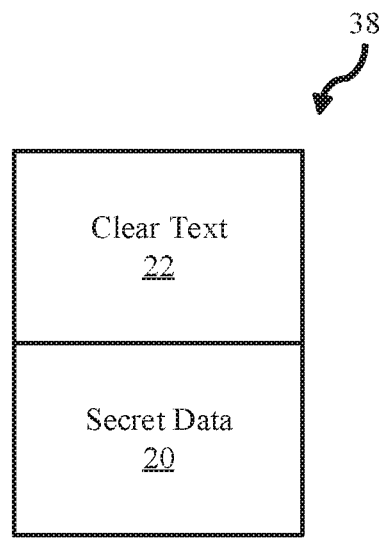
FIG. 3 depicts a license record for installing a functional unit in a computer system.

In FIG. 3, a license record 38 for installing a functional unit 10 in a computer system 212 is depicted. The license record 38 includes a clear text section 22, where the functional capabilities (e.g., number of ports and/or personalization data of the unit 10) are stored in clear text, which can be read by the customer. Further, the license record 38 includes secret data 20 where a license key is stored in a cryptographically secured form. The license record 38 is bound to a unique identification item 30, such as a serial number of the unit 10, which may also be transferred to the computer system 212 together with, or as part of, the license record 38.

Figure 4:
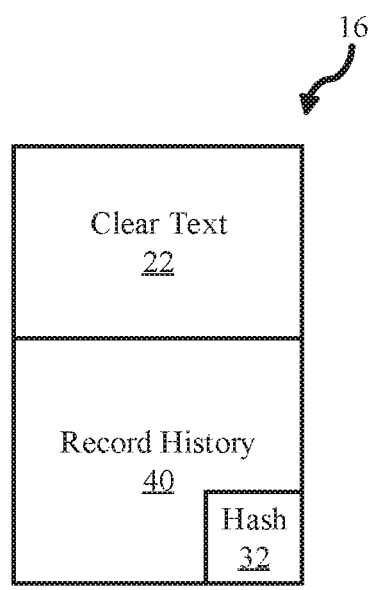
FIG. 4 depicts an example enablement data for installing a functional unit in a computer system, in accordance with embodiments of the present disclosure.

FIG. 4 shows an enablement data 16 for installing a functional unit 10 in a computer system 212, according to an embodiment of the invention. The enablement data 16 includes a clear text section 22, which main contain substantially the same data as in the license record 38 discussed in reference to FIG. 3.

Additionally, the enablement data 16 includes history data 40 of units 10 for which the enablement data 16 has been used (e.g., at least history data 40 of the first unit 10 it is to be used or has been used for). In other words, the record history 40 may include historical enablement data for each unit (including an original unit and any replacement units) associated with the enablement data. For example, a first unit may initially be installed in a computer system, and may be associated with (e.g., include) a first enablement data. The first unit may subsequently be replaced by a second unit if, for example, the first unit becomes damaged. The first enablement data, in either a modified form (e.g., to include new functionalities) or an unmodified form, may be copied over to the second unit, as discussed herein. The history record 40 may thus include enablement data related to both the first and second units. The history data 40 may be updated upon modifying the enablement data 16. Furthermore, the history data 40 may include time stamps related to changes to the enablement data 16 (e.g., when the enablement data 16 is created and/or modified).

Additionally, the enablement data 16 may include a cryptographically secured value 32, like a hash value, which may be used to verify that the content of the enablement data 16 is correct and has not been tampered with. Accordingly, the validity of the enablement data 16 may be determined based on the correctness of the cryptographically secured value 32.

Figure 5:
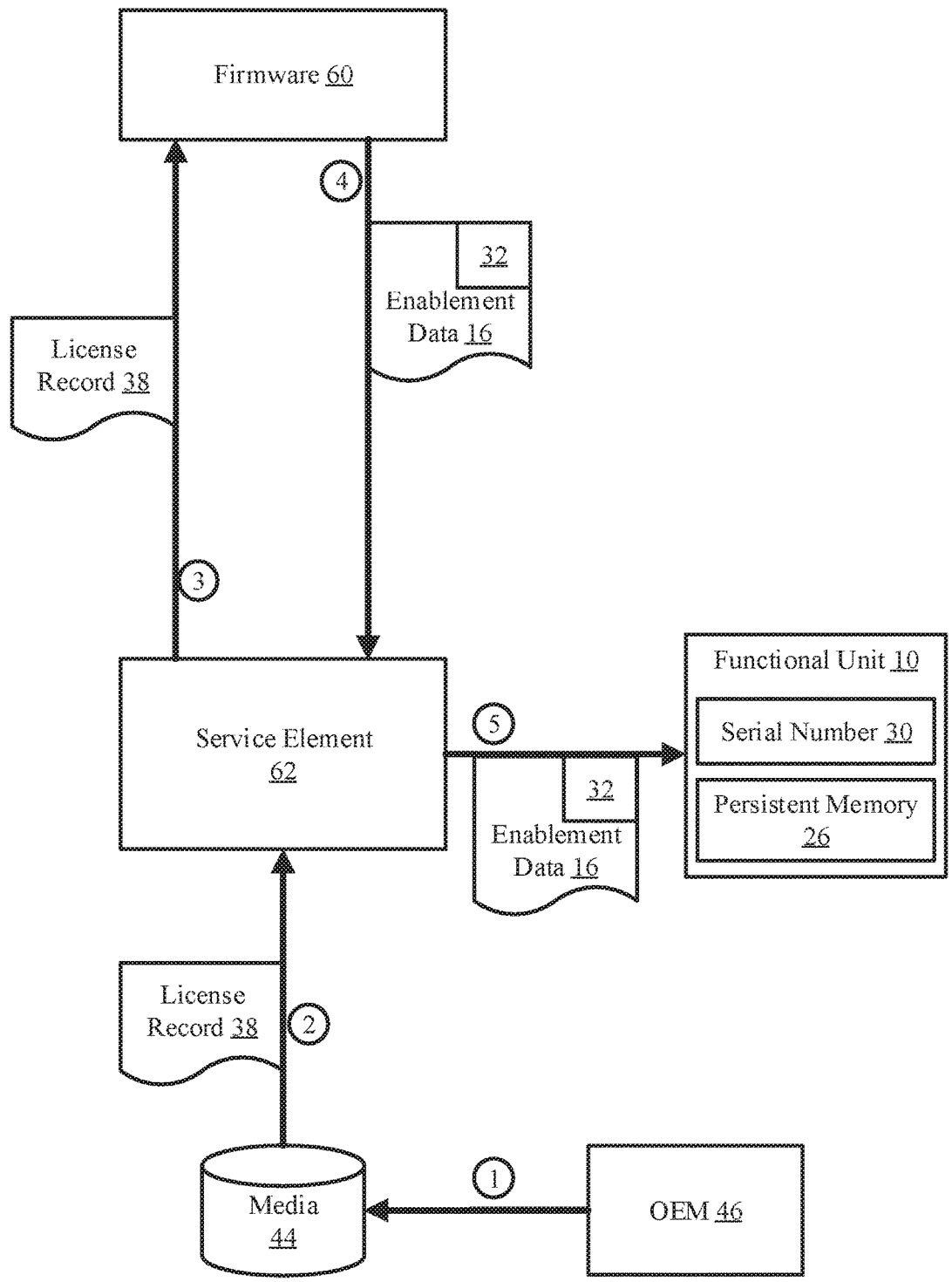
FIG. 5 depicts an example process flow for installing a functional unit in a computer system, in accordance with embodiments of the present disclosure.

FIG. 5 shows an example process flow for installing and configuring a functional unit 10 in a computer system (such as computer system 212, shown in FIG. 1), according to an embodiment of the invention. First, the functional unit 10 (e.g., an I/O card) may be installed (e.g., inserted) in its place in the computer system (e.g., in a slot, such as a PCI slot). Then, a license record 38 that includes secret data (e.g., a license key) and a unique identification item 30 (e.g., a serial number) of the unit 10, which may have been generated by the computer system manufacturer 46, is installed from media 44 delivered by the manufacturer 46, on the service element (SE) 62. Next, the license record 38 is sent to the firmware 60, where the secret data and the unique identification item 30 are stored in a persistent memory 14 of the computer system. The firmware 60 decrypts and validates the secret data and checks the unique identification item 30. Additionally, the firmware 60 may read the unique identification item 30 from the unit 10 for cross-checking. Upon validation, the firmware 60 creates the enablement data 16 with the cryptographically secured value 32 for the unit 10 based on the secret data. Next, the enablement data 16 is sent by the firmware 60 to the service element 62, followed by the service element 62 writing the enablement data 16 to a persistent memory 26 on the unit 10. Then, the firmware 60 completes the installation of the functional unit 10 by configuring the unit 10 for, e.g., the number of ports or the personalization of the unit 10.

The service element 62 in the process flow of FIG. 5 is optional. In some embodiments, the data from the media 44 may be directly sent to the firmware 60. For example, the firmware 60 may load the data directly from the media 44. Additionally, the enablement data 16 may be sent directly from the firmware 60 to the unit 10.

Figure 6:
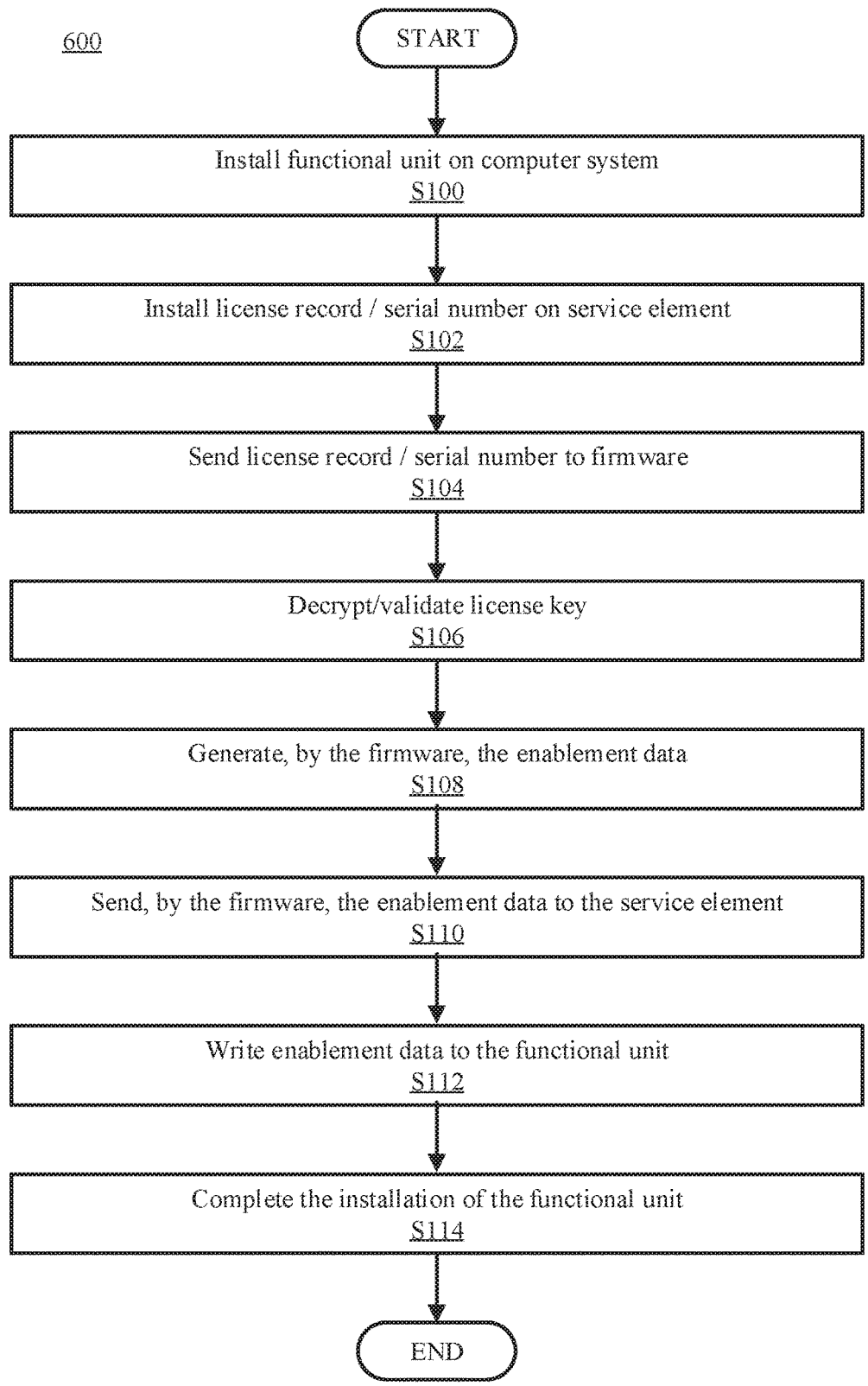
FIG. 6 depicts a flowchart of an example method for installing a functional unit in a computer system according to an embodiment of the invention.

FIG. 6 shows a flowchart of an example method 600 for installing a functional unit (e.g., functional unit 10 in FIG. 1) in a computer system (e.g., computer system 212 shown in FIG. 1), according to an embodiment of the invention. The method 600 may begin at step S100, where the functional unit (e.g., an I/O card) may be installed in its place in the computer system (e.g. in a slot). Then, in step S102 a license record (e.g., license record 38 shown in FIG. 5) with secret data (e.g., a license key), as well as a unique identification item (e.g., a serial number) of the unit, may be installed from a media (e.g., a CD) of the manufacturer on the service element (SE) 62. In some embodiments, the license record and/or secret data may be generated by the computer system manufacturer. Next, in step S104, the license record as well as the unique identification item may be sent to the computer system. The computer system may include a firmware (e.g., firmware 60 shown in FIG. 5), and a persistent memory. The firmware may decrypt and validate the secret data in step S106. Additionally, the firmware may check the unique identification item. Upon validation, in step S108, the firmware may generate the enablement data for the unit. The enablement data may include a cryptographically secured value and be based on the secret data. In step S110, the enablement data may be sent by the firmware to the service element, followed by the service element writing the enablement data in step S112 to a persistent memory of the unit (e.g., persistent memory 26 in FIG. 5). Then, in step S114, the firmware may complete the installation of the functional unit by configuring the unit for, e.g., the number of ports or the personalization of the unit.

One or more operations of the method 600 may be optionally performed, or not performed at all. For example, steps S102, S110, and S112 are optional because, in the absence of the service element, the data could also be sent directly to the firmware and to the persistent memory of the unit. In some embodiments, the method 600 may be performed by a computer system (e.g., computer system 212 shown in FIG. 12). In some embodiments, one or more operations of the method 600 may be performed by a user, or by the computer system in response to user input.

Figure 7:
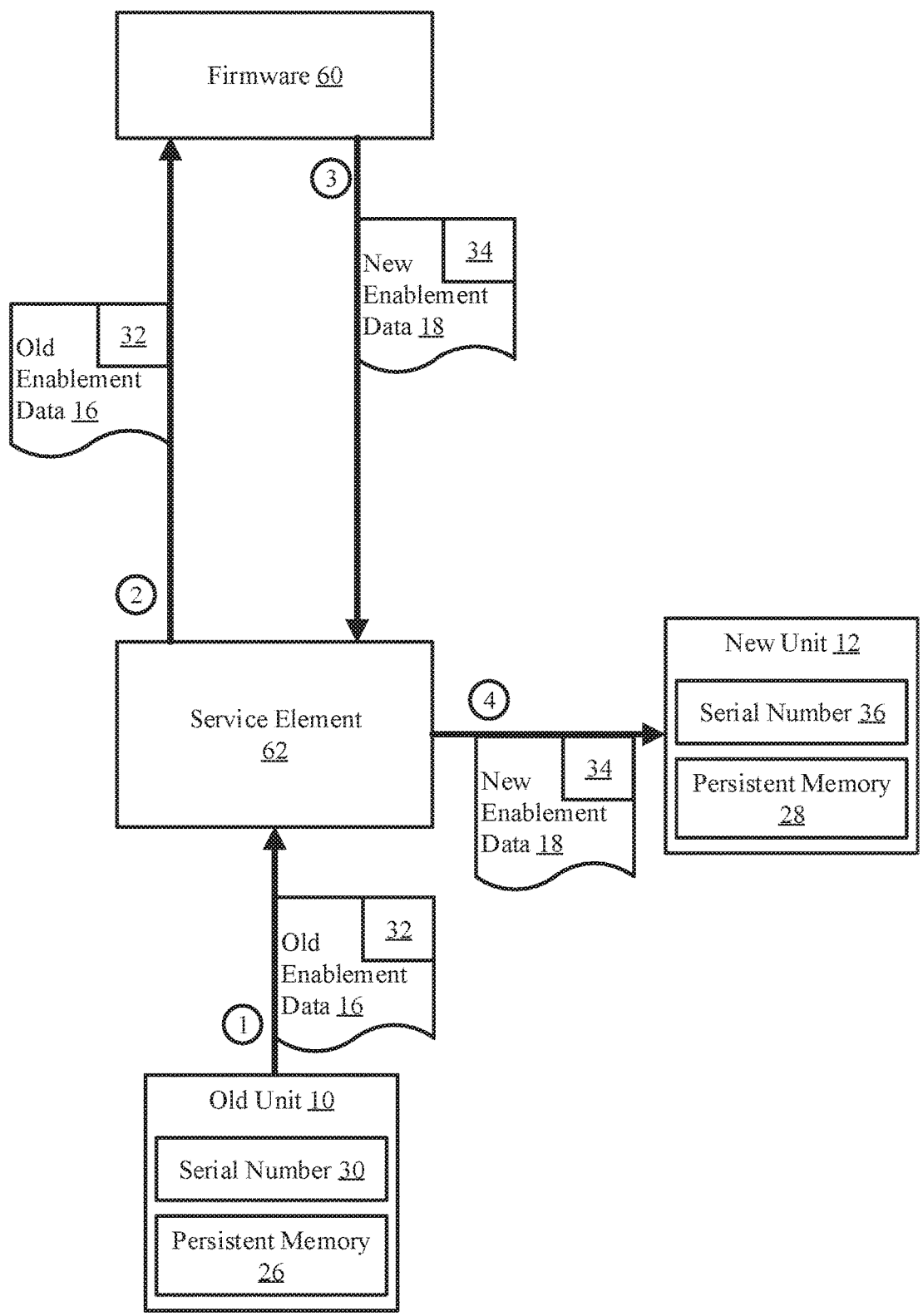
FIG. 7 depicts an example process flow for replacing a functional unit in a computer system, in accordance with embodiments of the present disclosure.

FIG. 7 depicts an example process flow for replacing a functional unit 10 in a computer system, according to embodiments of the present disclosure. First, the SE 62 reads the enablement data 16 from the old functional unit 10 and erases the enablement data 16 on the unit 10 (e.g., erases it from the persistent memory 26). Then, the replacement unit 12, which is called new unit 12 for simplification, is installed in the computer system. Next, the SE 62 sends the old enablement data 16 to the firmware 60 along with the old and the new unique identification items 30, 36 (e.g., the serial numbers of the units 10, 12, respectively). Then, the firmware 60 validates the old enablement data 16 (e.g., using the old cryptographically secured value 32 stored on the old unit 10). After validating the old enablement data 16, the firmware 60 creates a new enablement data 18 using the new unique identification item 36. The new enablement data 18 may be based on the old enablement data 16. Additionally, the new enablement data may have a new cryptographically secured value 34, which may be generated by the firmware 60. Next, the firmware sends the new enablement data 18 to the SE 62, and then the SE 62 writes the new enablement data 18 to the persistent memory 28 of the new unit 12. Afterwards, the firmware 60 completes the replacement process (e.g., by configuring the new unit 12 using the new enablement data 18, as discussed herein).

Figure 8:
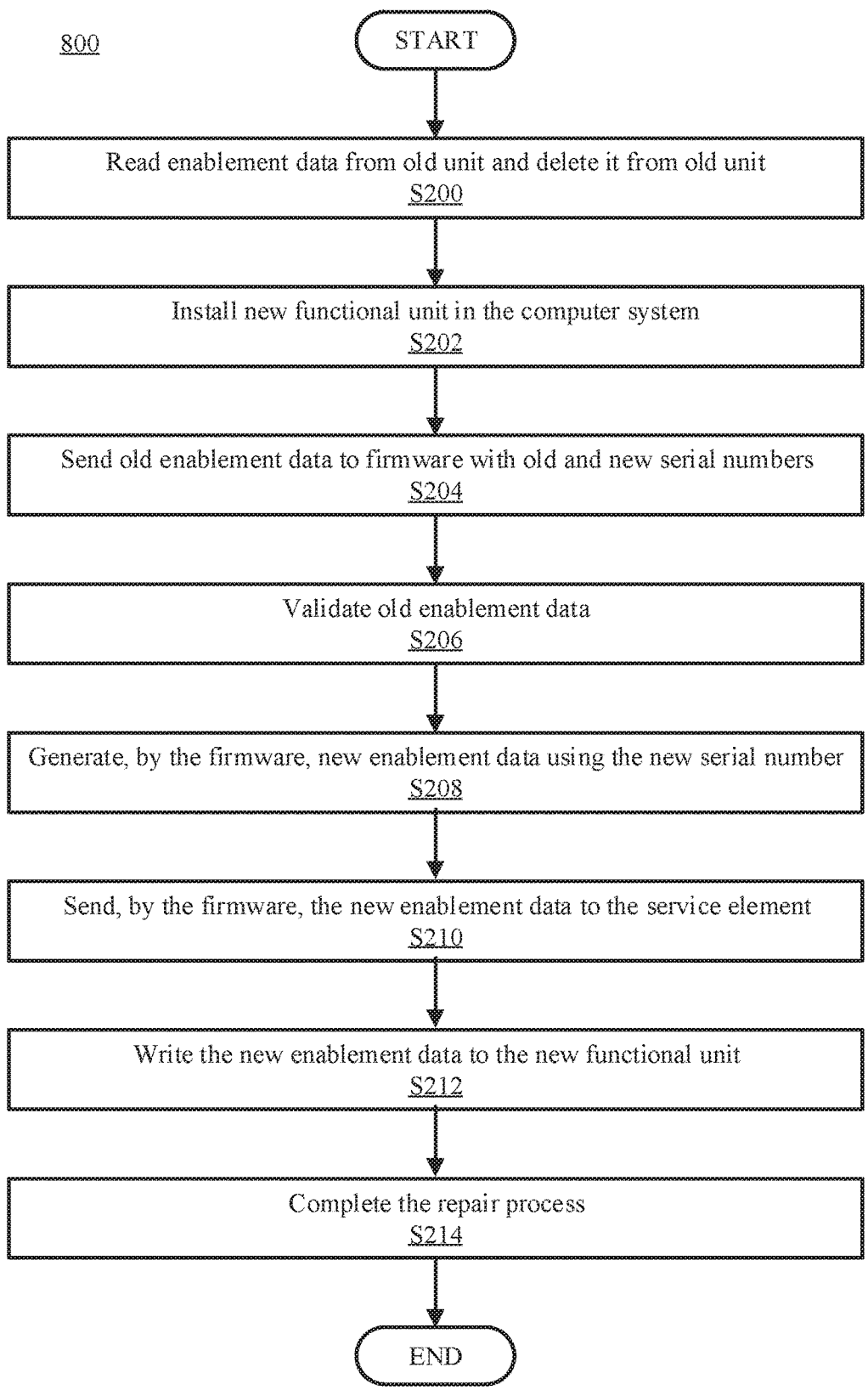
FIG. 8 depicts a flowchart of an example method for replacing a functional unit in a computer system, in accordance with embodiments of the present disclosure.

FIG. 8 shows a flowchart of an example method 800 for replacing a functional unit (e.g., old unit 10 shown in FIG. 7) in a computer system, according to embodiments of the present disclosure. In some embodiments, the method 800 may be performed by a computer system (e.g., computer system 212 shown in FIG. 12). In some embodiments, one or more operations of the method 800 may be performed by a user, or by the computer system in response to user input.

The method 800 may being at step S200, where the SE may read the enablement data from the old functional unit and erase the enablement data on the unit. Then, in step S202, the new replacement unit may be installed in the computer system. Next, in step S204, the SE may send the old enablement data to the firmware, along with the old and the new unique identification items (e.g., the serial numbers of the old and replacement units, respectively). Then, in step S206, the firmware may validate the old enablement data, followed in step S208 by the firmware creating a new enablement data based on the old enablement data. The firmware may use the new unique identification item to generate the new enablement data. Next, in step S210, the firmware may send the new enablement data to the SE and then, in step S212, the SE may write the new enablement data to the persistent memory of the new unit. Afterwards, in step S214, the firmware may complete the replacement process by, for example, configuring the new functional unit as described herein.

Figure 9:
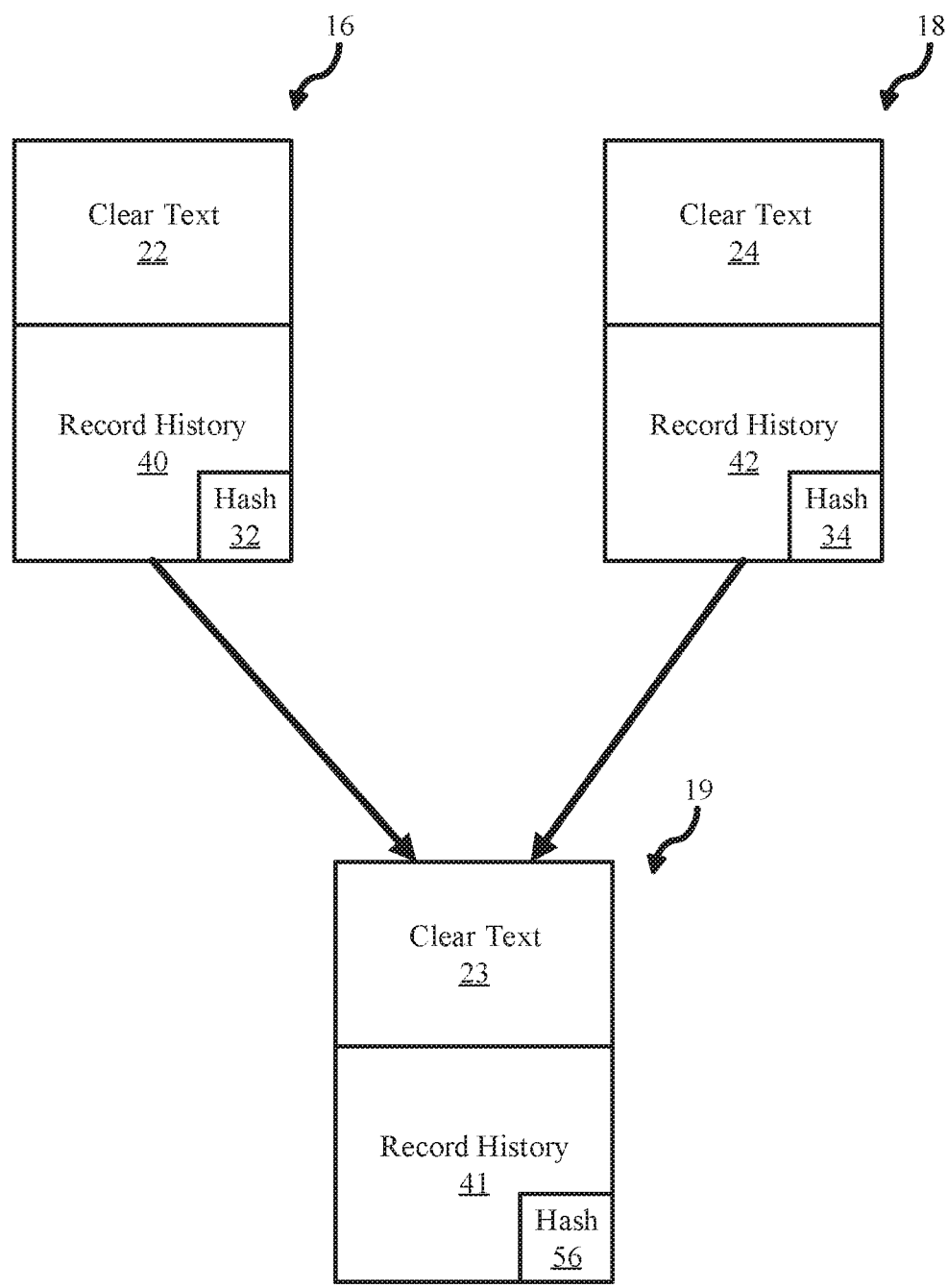
FIG. 9 depicts an example process of merging two enablement data records into a combined enablement data, in accordance with embodiments of the present disclosure.

FIG. 9 depicts a process of merging two enablement data records 16, 18 into a combined enablement data 19, according to embodiments of the present disclosure. Merging of at least two enablement data 16, 18 to a combined enablement data 19 may be performed in order to add additional functional capabilities to the unit defined with two different license keys. As discussed herein, each enablement data 16, 18 (which may be in the form of an enablement data record) may have a clear text portion 22, 24, a record history portion 40, 42, and a cryptographically secured value (e.g., a hash) 32, 34.

After merging the two original enablement data 16, 18 to the new enablement data 19, the combined enablement data 19 may be transferred to the unit, thus configuring the unit with additional functional capabilities. For this purpose, the clear text sections 22, 24 may be merged to the new clear text section 23 of the combined enablement data 19. Additionally, the history data 40, 42 may be merged to the new history data 41. The combined enablement data 19 may also include a new cryptographically secured value 56 for validation of the data.

Figure 10:
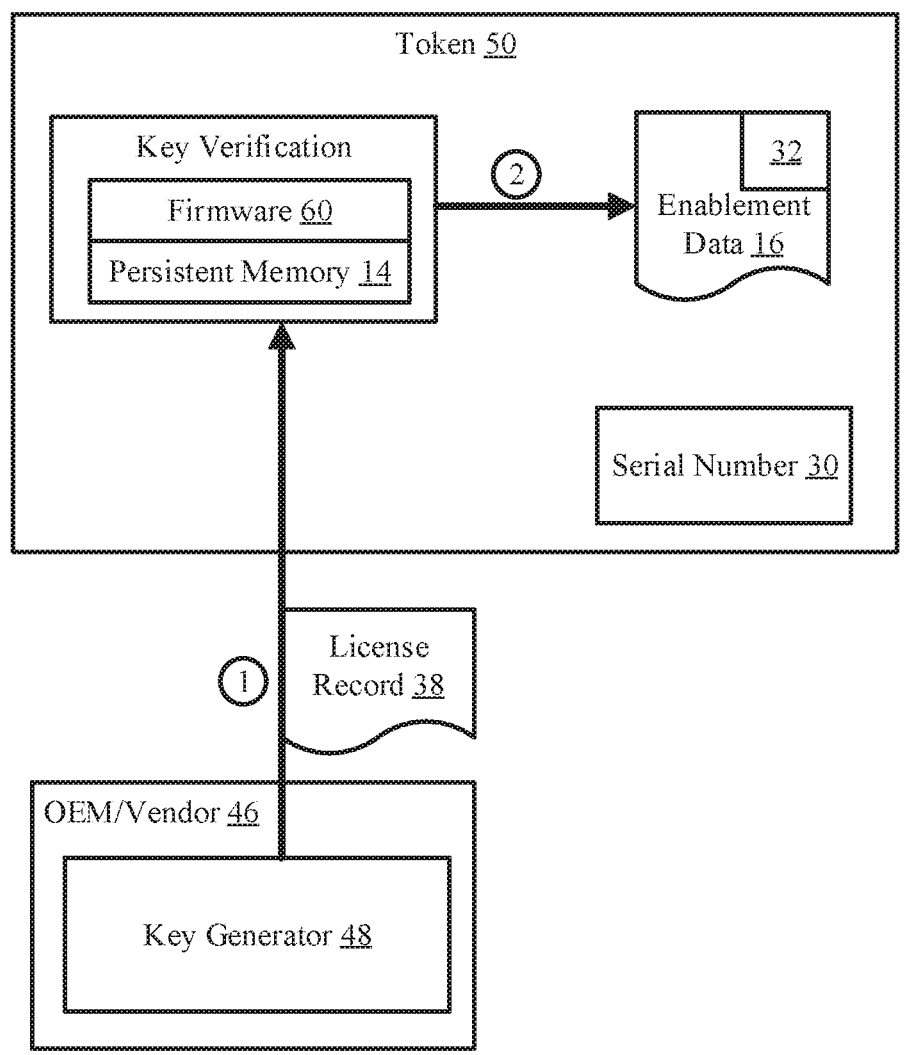
FIG. 10 depicts an example process flow for installing a token, in accordance with embodiments of the present disclosure.

FIG. 10 shows a process flow for installing a token 50, according to embodiments of the present disclosure. The unit (e.g., unit 10 shown in FIG. 1) may be implemented as a token 50 which is enabled for licensing by enablement data 16. For installation of the token 50, a license record 38 with secret data (e.g., a license key) bound to a unique identification item 30 (e.g., a serial number) of the token 50 is generated by a key generation facility 48 (e.g., module) by the vendor 46 of the token 50. The license record 38 with the secret data may be transferred to a persistent memory 14 connected to a key verification facility (e.g., module) implemented in firmware 60 or software on the token 50. The key verification facility of the token 50 may create the enablement data 16 with a cryptographically secured value 32, based on the secret data and the unique identification item of the token 50. By means of this enablement data 16, the token may be configured and become functional, as described herein.

Figure 11:
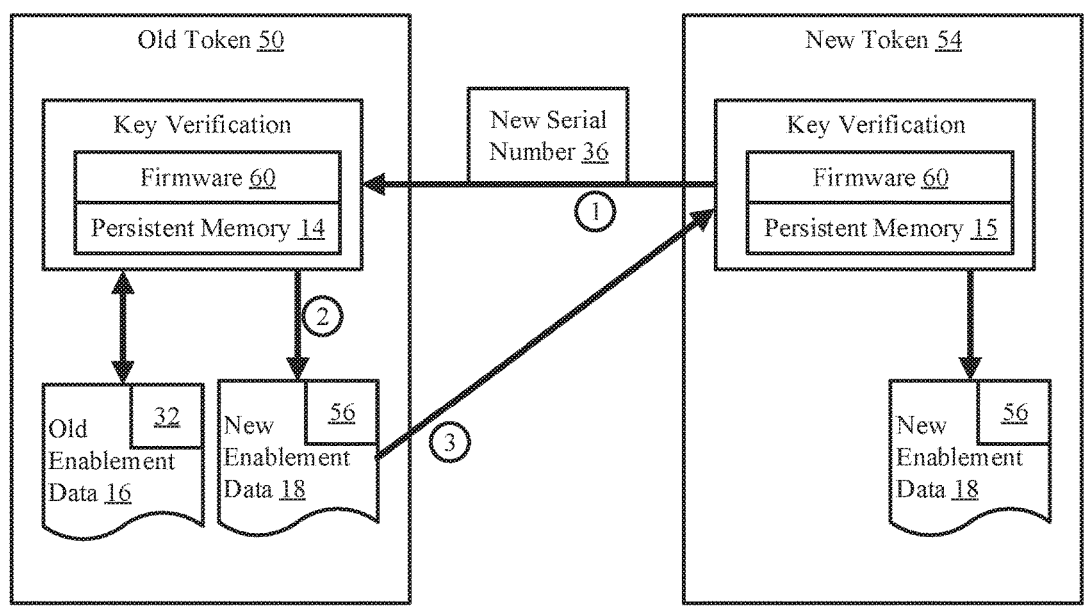
FIG. 11 depicts an example process flow for replacing a token, in accordance with embodiments of the present disclosure.

FIG. 11 shows an example process flow for replacing a token 50, according to embodiments of the present disclosure. In response to a replacement action (e.g., if the token 50 has to be replaced by a replacement token 54, called new token 54 in FIG. 11, because it exhibits defects or because the license key needs to be exchanged), the token 50 may obtain the unique identification item 36 from the replacement token 54. Next, new enablement data 18 may be provided by replacing the stored cryptographically secured value 32 in the stored enablement data 16 with a new cryptographically secured value 56 derived from the secret data, and the unique identification item 36 of the replacement token 54. In some embodiments, the key verification facility (e.g., the firmware) of the token 50 may provide the new enablement data. In some embodiments, the new enablement data 18 can be generated new (e.g., by the firmware). The new enablement data 18 may then be transferred to the replacement token 54, and the token 50 may be disabled. In some embodiments, the token 50 may disable itself. The secret data may be transferred with the new enablement data 18 to the replacement token 54 and stored in a persistent memory 15 of the replacement token 54. Once the new token 54 receives the new enablement data 18, the new token 54 may become functional for.

Figure 12:
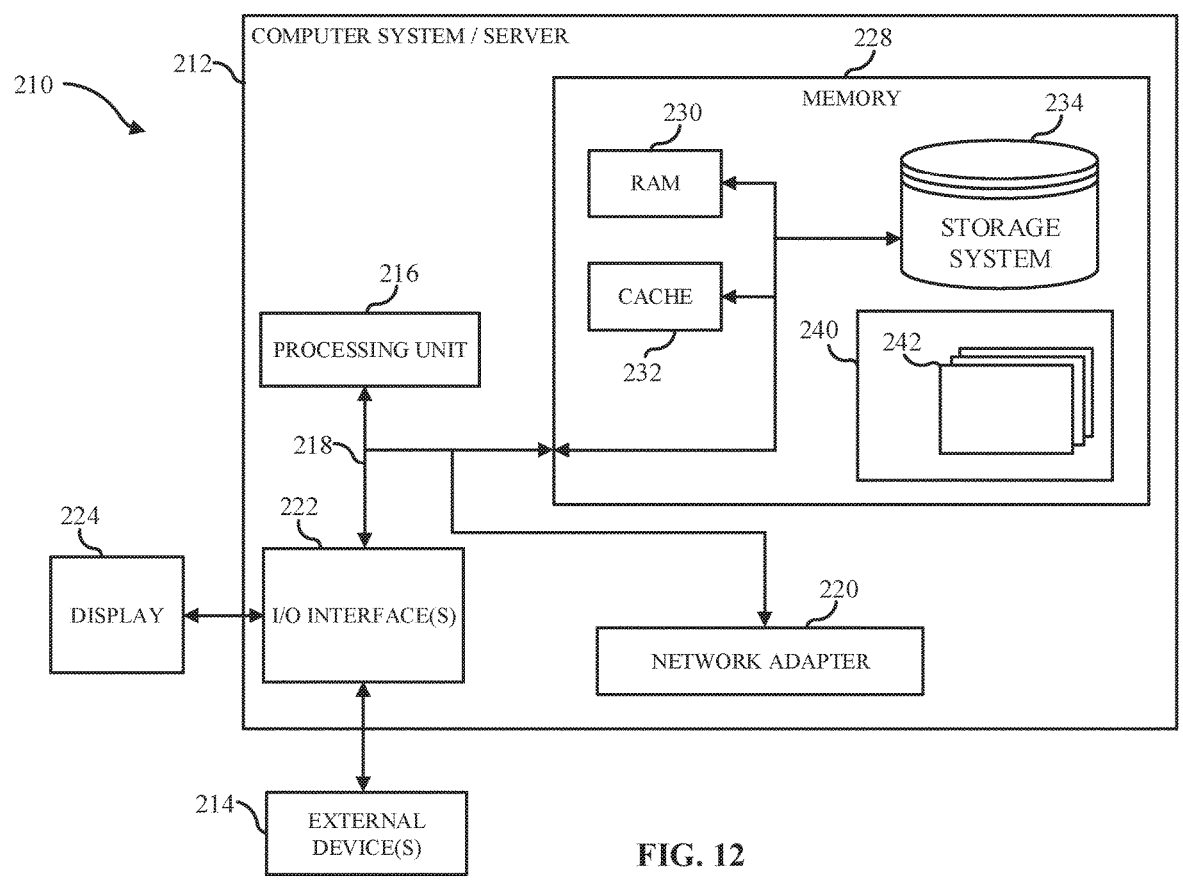
FIG. 12 depicts an example embodiment of a data processing system for executing a method, in accordance with embodiments of the present disclosure.

Referring now to FIG. 12, a schematic of an example of a data processing system 210 is shown. Data processing system 210 is only one example of a suitable data processing system and is not intended to suggest any limitation as to the scope of use or functionality of embodiments of the invention described herein. Regardless, data processing system 210 is capable of being implemented and/or performing any of the functionality set forth herein above.

In data processing system 210 there is a computer system/server 212, which is operational with numerous other general purpose or special purpose computing system environments or configurations. Examples of well-known computing systems, environments, and/or configurations that may be suitable for use with computer system/server 212 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 212 may be described in the general context of computer system executable instructions, such as program modules, being executed by a computer system. Generally, program modules may include routines, programs, objects, components, logic, data structures, and so on that perform particular tasks or implement particular abstract data types. Computer system/server 212 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 12, computer system/server 212 in data processing system 210 is shown in the form of a general-purpose computing device. The components of computer system/server 212 may include, but are not limited to, one or more processors or processing units 216, a system memory 228, and a bus 218 that couples various system components including system memory 228 to processor 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 212 typically includes a variety of computer system readable media. Such media may be any available media that is accessible by computer system/server 212, and it includes both volatile and non-volatile media, removable and non-removable media.

System memory 228 can include computer system readable media in the form of volatile memory, such as random access memory (RAM) 230 and/or cache memory 232. Computer system/server 212 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 242, may be stored in memory 228 by way of example, and not limitation, as well as an Operating System, one or more application programs, other program modules, and program data. Each of the Operating System, one or more application programs, other program modules, and program data or some combination thereof, may include an implementation of a networking environment. Program modules 242 generally carry out the functions and/or methodologies of embodiments of the invention as described herein.

Computer system/server 212 may also communicate with one or more external devices 214 such as a keyboard, a pointing device, a display 224, etc.; one or more devices that enable a user to interact with computer system/server 212; and/or any devices (e.g., network card, modem, etc.) that enable computer system/server 212 to communicate with one or more other computing devices. Such communication can occur via Input/Output (I/O) interfaces 222. Still yet, computer system/server 212 can communicate with one or more networks such as a local area network (LAN), a general wide area network (WAN), and/or a public network (e.g., the Internet) via network adapter 220. As depicted, network adapter 220 communicates with the other components of computer system/server 212 via bus 218. It should be understood that although not shown, other hardware and/or software components could be used in conjunction with computer system/server 212. Examples, include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, Firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for configuring functional capabilities of a computer system that comprises two or more persistent memories and two or more replaceable functional units, the method comprising:
    transferring, in response to a repair action for a first functional unit, first enablement data stored on the first functional unit to a servicer, wherein the first enablement data stored on the first functional unit is in a first persistent memory of the first functional unit, wherein the first enablement data is associated with a first unique identification number that corresponds to the first functional unit, the first enablement data specifying one or more functional capabilities of the first functional unit, and wherein the one or more functional capabilities are enabled in the first functional unit;
    erasing, after transferring the first enablement data in the first persistent memory to the servicer, the first enablement data from the first persistent memory;
    obtaining, by the servicer, in response to a replacement action for the first functional unit, a second unique identification number that corresponds to a second functional unit;
    transferring, from the servicer, the first unique identification number and the second unique identification number to a trusted environment in the computer system;
    transforming, in the trusted environment, the first enablement data to second enablement data by replacing the first unique identification number with the second unique identification number; and
    transferring the second enablement data to the second functional unit, wherein the second enablement data is stored in a second persistent memory of the second functional unit, wherein the second enablement data specifies one or more functional capabilities of the second functional unit, and wherein the one or more functional capabilities of the second functional unit are the same as the one or more functional capabilities of the first functional unit.

2. The method of claim 1, wherein the one or more functional capabilities of the first functional unit are a subset of all the functional capabilities of the first functional unit, and wherein functional capabilities of the first functional unit that are not in the first enablement data are disabled.

3. The method of claim 1, wherein the first enablement data comprises a cryptographically secured value derived from secret data and the first unique identification number, the secret data being stored in the first persistent memory, wherein the secret data is a license key that is specific to the first functional unit, and wherein the validity of the first enablement data is determined based on the correctness of the cryptographically secured value.

4. The method of claim 3, wherein the cryptographically secured value is the license key implemented as a hash value.

5. The method of claim 3, wherein the cryptographically secured value includes a cryptographic function for ensuring correctness of the first enablement data.

6. The method of claim 3, further comprising:
    modifying the one or more functional capabilities of the first functional unit by modifying the first enablement data based on new secret data transferred to the first persistent memory; and
    transferring the modified enablement data to the first functional unit.

7. The method of claim 3, wherein the first enablement data includes history data of one or more functional units associated with the first enablement data, wherein the history data is updated upon modifying the first enablement data.

8. The method of claim 7, wherein the history data further comprises time stamps corresponding to a modification of the enablement data.

9. The method of claim 3, further comprising:
    merging at least two enablement data records to generate a combined enablement data record to add functional capabilities to the first functional unit; and
    transferring the combined enablement data to the first functional unit, wherein the combined enablement data record includes at least one enabled functional capability that is not in the one or more functional capabilities of the first functional unit.

10. The method of claim 3, wherein the first functional unit is implemented as a token, the token being enabled for licensing by the first enablement data.

11. The method of claim 10, the method further comprising:
    obtaining, by the token and in response to the replacement action, the second unique identification number from a replacement token;
    obtaining the second enablement data by replacing the cryptographically secured value in the first enablement data with a new cryptographically secured value derived from the secret data and the second unique identification number of the replacement token;

transferring the second enablement data to the replacement token; and
disabling the token.

12. The method of claim 3, wherein the method is implemented in a firmware of the computer system, the firmware having access to the first and second persistent memories.

13. The method of claim 12, wherein the firmware is configured to validate the cryptographically secured value.

14. The method of claim 12, wherein the firmware communicates with the first and second functional units using the servicer.

15. The method of claim 3, wherein the method further comprises:
  determining, by the computer system, a first set of functional capabilities of the first functional unit, the first set of functional capabilities including all functional capabilities the first functional unit is capable of performing;
  determining, using the first enablement data, the one or more specified functional capabilities of the first functional unit;
  enabling, by the computer system, the one or more specified functional capabilities of the first functional unit; and
  disabling, by the computer system, a second set of functional capabilities, the second set of functional capabilities including functional capabilities that are in the first set and not specified in the first enablement data.

16. The method of claim 3, further comprising:
  enabling, by the first functional unit, the one or more specified functional capabilities; and
  disabling, by the first functional unit, the remaining functional capabilities of the first functional unit.

17. The method of claim 1, wherein erasing the first enablement data from the first functional unit comprises:
  removing, permanently, the first enablement data from the first persistent memory.

* * * * *